United States Patent
Tsujita et al.

(10) Patent No.: US 10,495,814 B2
(45) Date of Patent: Dec. 3, 2019

(54) OPTICAL WAVEGUIDE

(71) Applicant: NITTO DENKO CORPORATION, Ibaraki-shi, Osaka (JP)

(72) Inventors: Yuichi Tsujita, Ibaraki (JP); Norihiko Okamoto, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 16/082,653

(22) PCT Filed: Feb. 7, 2017

(86) PCT No.: PCT/JP2017/004289
§ 371 (c)(1),
(2) Date: Sep. 6, 2018

(87) PCT Pub. No.: WO2017/159119
PCT Pub. Date: Sep. 21, 2017

(65) Prior Publication Data
US 2019/0025504 A1    Jan. 24, 2019

(30) Foreign Application Priority Data

Mar. 17, 2016  (JP) .................................. 2016-053746

(51) Int. Cl.
*G02B 6/122* (2006.01)
*G02B 6/02* (2006.01)
(Continued)

(52) U.S. Cl.
CPC ......... *G02B 6/122* (2013.01); *G02B 6/02033* (2013.01); *G02B 6/1221* (2013.01);
(Continued)

(58) Field of Classification Search
None
See application file for complete search history.

(56) References Cited

U.S. PATENT DOCUMENTS

2012/0314990 A1* 12/2012 Pitwon ................. G02B 6/1221
385/14
2015/0192735 A1* 7/2015 Ellis-Monaghan .... G02B 6/136
385/14

FOREIGN PATENT DOCUMENTS

JP    2-90109 A    3/1990
JP    3-171008 A   7/1991
(Continued)

OTHER PUBLICATIONS

International Preliminary Report on Patentability (Form PCT/IB/338) issued in counterpart International Application No. PCT/JP2017/004289 dated Sep. 27, 2018, with Form PCT/IB/373 and PCT/ISA/237 (6 pages).

(Continued)

*Primary Examiner* — Chad H Smith
(74) *Attorney, Agent, or Firm* — Westerman, Hattori, Daniels & Adrian, LLP

(57) ABSTRACT

The present disclosure provides an optical waveguide capable of enhancing the suppression of crosstalk. This optical waveguide includes: under claddings; cores for light propagation arranged in side-by-side relation on surfaces of the respective under claddings; over claddings covering the cores; and a light absorbing part provided between adjacent ones of the cores and adjacent to light exit member connecting portions for connection to light exit members, the light exit member connecting portions being disposed in first end portions of the adjacent cores, the light absorbing part being in non-contacting relationship with the cores. The light absorbing part contains a light absorbing agent having an ability to absorb light exiting the light exit members. The optical waveguide is produced on a surface of a substrate.

6 Claims, 16 Drawing Sheets

(51) Int. Cl.
     *G02B 26/08*   (2006.01)
     *G02B 6/138*   (2006.01)
     *G02B 6/12*        (2006.01)
     *G02B 6/00*        (2006.01)

(52) U.S. Cl.
     CPC ......... *G02B 6/138* (2013.01); *G02B 26/0816* (2013.01); *G02B 6/00* (2013.01); *G02B 2006/12126* (2013.01); *G02B 2006/12176* (2013.01)

(56) References Cited

FOREIGN PATENT DOCUMENTS

| | | | | |
|---|---|---|---|---|
| JP | 2000-028837 | * | 1/2000 | ............ G02B 6/122 |
| JP | 2000-28837 A | | 1/2000 | |
| JP | 2004-109784 A | | 4/2004 | |
| JP | 2014-2218 A | | 1/2014 | |
| JP | 2015-25907 A | | 2/2015 | |
| WO | 99/46619 A1 | | 9/1999 | |

OTHER PUBLICATIONS

International Search Report dated Apr. 25, 2017, issued in counterpart International Application No. PCT/JP2017/004289 (2 pages).
Office Action dated Sep. 10, 2019, issued in counterpart JP Application No. 2016-053746, with English translation (6 pages).

* cited by examiner

RELATED ART

RELATED ART

RELATED ART

RELATED ART

OPTICAL WAVEGUIDE

TECHNICAL FIELD

The present disclosure relates to an optical waveguide for use in the fields of optical communications, optical information processing and other general optics.

BACKGROUND ART

As shown in FIG. 16A in plan view and as shown in FIG. 16B in sectional view taken along the line D-D of FIG. 16A, an optical waveguide W19 in general includes: an under cladding 1; linear cores 2 for light propagation protruding in a predetermined pattern and formed on a surface of the under cladding 1; and an over cladding 3 formed on the surface of the under cladding 1 so as to cover the cores 2. The optical waveguide W19 is configured such that light enters a light entrance portion 2a disposed in a first end portion of each of the cores 2 and that the light exits alight exit portion 2b disposed in a second end portion of each of the cores 2. Specifically, a light exit member 10 such as an optical fiber, a light-emitting element, or the like is connected to the light entrance portion 2a disposed in the first end portion of each core 2, and light exiting the light exit member 10 enters the light entrance portion 2a disposed in the first end portion of each core 2 and is propagated in each core 2 to the light exit portion 2b disposed in the second end portion of each core 2 while being reflected repeatedly from an interface with the under cladding 1 and an interface with the over cladding 3 although not shown. In FIG. 16A, optical fibers are shown as the light exit members 10. In FIG. 16B, the reference numeral 7 designates a substrate for use in the production of the optical waveguide W19.

In actuality, there are cases in which the light exit member 10 and the light entrance portion 2a of each core 2 are slightly different in size from each other or slightly misaligned with each other, with the light exit member 10 and the light entrance portion 2a of each core 2 connected to each other. In the case where the light exit member 10 and the light entrance portion 2a of one of the cores 2 are slightly different in size from each other (with reference to a left-hand end portion in FIG. 16A), part of the light exiting the light exit member 10 sometimes does not enter the one core 2 but enters the over cladding 3 surrounding the one core 2 (with reference to dash-double-dot arrows L1). In the case where the light exit member 10 and one of the cores 2 are slightly misaligned with each other (with reference to a right-hand end portion in FIG. 16A), part of the light exiting the light exit member 10 also sometimes does not enter the one core 2 but enters the over cladding 3 surrounding the one core 2 (with reference to dash-double-dot arrows L2).

In the optical waveguide W19 including the cores 2 for light propagation arranged in side-by-side relation, the entrance of part of the light exiting the light exit member 10 into the over cladding 3, rather than a predetermined one of the cores 2, in the aforementioned manner causes what is called "crosstalk" that is a situation in which the light enters a core 2 adjacent to the predetermined core 2. The light entering the adjacent core 2 is noise (N) for light (signal S) propagating in the adjacent core 2, and decreases the S/N ratio to make optical communications unstable.

As shown in FIG. 17 in plan view, there are cases in which a light entrance member 20 such as an optical fiber, a light-receiving element, or the like which receives light exiting the light exit portion 2b disposed in the second end portion of each core 2 is connected to the light exit portion 2b. In such cases, crosstalk also sometimes occurs. Specifically, there are cases in which light leaks from a predetermined one of the cores 2 into the over cladding 3 and the leaking light enters the light entrance member 20 connected to the light exit portion 2b disposed in the second end portion of a core 2 adjacent to the predetermined core 2 (with reference to dash-double-dot arrows L3 and L4). In a left-hand end portion of FIG. 17, the light entrance member 20 and the light exit portion 2b of a core 2 are slightly different in size from each other. In a right-hand end portion of FIG. 17, the light entrance member 20 and a core 2 are slightly misaligned with each other.

To solve such a problem, an optical waveguide W20 has been proposed as shown in FIG. 18A in plan view and as shown in FIG. 18B in sectional view taken along the line E-E of FIG. 18A (see PTL 1, for example). In the optical waveguide W20, dummy cores 2D made of the same material as the cores 2 and not used for light propagation are provided between adjacent ones of the cores 2 for light propagation to thereby suppress crosstalk. Like the cores 2, the dummy cores 2D in this optical waveguide W20 have a refractive index higher than the refractive indices of the under cladding 1 and the over cladding 3. In the optical waveguide W20, it is hence intended that light entering the dummy cores 2D after entering the over cladding 3, rather than the cores 2, is less prone to leak from the dummy cores 2D, although not shown. For the purpose of clarifying the arrangement of the cores 2 and the dummy cores 2D, the cores 2 and the dummy cores 2D are shaded by means of broken diagonal lines in FIG. 18A, and the diagonal lines for the dummy cores 2D are spaced more widely than those for the cores 2.

RELATED ART DOCUMENT

Patent Document

PTL 1: JP-A-2014-2218

SUMMARY OF INVENTION

Unfortunately, most of the light not entering the cores 2 but entering the over cladding 3 in the conventional optical waveguide W20 including the dummy cores 2D is in actuality transmitted through the dummy cores 2D (with reference to dash-double-dot arrows L5 and L6), so that crosstalk is not sufficiently suppressed. In the course of the production of the optical waveguide W20, there are cases in which foreign substances come into the dummy cores 20 and in which interfaces between the dummy cores 2D and the over cladding 3 are formed into rough surfaces. When light entering a dummy core 2D impinges upon foreign substances, if any, in the dummy core 2D, there are cases in which the light is reflected in an irregular direction. As a result, the light is not reflected from the interfaces but is transmitted through the interfaces (leaks from the dummy core 2D) (with reference to the dash-double-dot arrows L5). When the interfaces are rough surfaces, there are cases in which light reaching the interfaces is not reflected from the interfaces but is transmitted through the interfaces (leaks from the dummy cores 2D) (with reference to the dash-double-dot arrows L6). Thus, if light not entering the cores 2 but entering the over cladding 3 enters the dummy cores 2D, there often arises a problem such that the light is transmitted through the dummy cores 2D.

In view of the foregoing, it is therefore an object of the present disclosure to provide an optical waveguide capable of enhancing the suppression of crosstalk even if light exiting a light exit member does not enter a predetermined core.

An optical waveguide according to the present disclosure comprises: a plurality of cores for light propagation arranged in side-by-side relation; and a light absorbing part provided between adjacent ones of the cores for light propagation, the light absorbing part being in non-contacting relationship with the cores, wherein each of the cores has a first end portion serving as a light exit member connecting portion for connection to a light exit member, and wherein the light absorbing part is positioned adjacent to the light exit member connecting portions disposed in the first end portions of the adjacent cores, and contains a light absorbing agent having an ability to absorb light exiting the light exit member.

The present inventors have made studies about the structure of an optical waveguide including a plurality of cores for light propagation arranged in side-by-side relation for the purpose of enhancing the suppression of crosstalk in the case where light exiting light exit members does not enter a predetermined one of the cores. In the course of the studies, the present inventors have hit upon the idea of providing a light absorbing part between adjacent ones of the cores and adjacent to light exit member connecting portions for connection to the light exit members, the light exit member connecting portions being disposed in first end portions of the adjacent cores. The light absorbing part contains a light absorbing agent having an ability to absorb light exiting the light exit members. As a result, the present inventors have found out that, when light exiting the light exit members and not entering the predetermined core impinges upon the light absorbing part, the light is absorbed by the light absorbing part and does not enter a core adjacent to the predetermined core, so that the suppression of crosstalk can be enhanced. However, the present inventors have obtained findings that, when the light absorbing part is provided in contact with the cores, light entering the cores and propagating in the cores is absorbed and attenuated by the light absorbing part each time the light is reflected from an interface with the light absorbing part. That is, when the light absorbing part is in contact with the cores, the proper light propagation in the cores is not achieved even while the suppression of crosstalk can be enhanced. Thus, the present inventors have found that the provision of the light absorbing part in non-contacting relationship with the cores consequently achieves the proper light propagation in the cores as well as the enhancement of the suppression of crosstalk.

The optical waveguide according to the present disclosure includes the cores for light propagation arranged in side-by-side relation, and the light absorbing part provided between adjacent ones of the cores and adjacent to the light exit member connecting portions for connection to the light exit members, the light exit member connecting portions being disposed in first end portions of the adjacent cores. The light absorbing part contains a light absorbing agent having an ability to absorb light exiting the light exit members. Thus, light exiting the light exit members and not entering the predetermined core impinges upon the light absorbing part to thereby be absorbed by the light absorbing part, and is prevented from entering a core adjacent to the predetermined core. Therefore, the optical waveguide according to the present disclosure produces the effect of suppressing crosstalk. In addition, the light absorbing part in the optical waveguide according to the present disclosure is provided in non-contacting relationship with the cores. Thus, light entering the cores and propagating in the cores is prevented from being absorbed and attenuated by the light absorbing part, and propagates in the cores.

Further, in the case where each of the cores has a second end portion serving as a light entrance member connecting portion for connection to a light entrance member and where the light absorbing part is positioned also adjacent to the light entrance member connecting portions disposed in the second end portions of the adjacent cores, the entrance of light leaking from a predetermined one of the cores into the light entrance member connected to a core adjacent to the predetermined core (crosstalk) is suppressed by the light absorbing part in the second end portion.

In particular, in the case where the non-contacting relationship between the cores and the light absorbing part is established by a cladding surrounding the cores, the suppression of crosstalk is enhanced without high costs because the cladding is typically used in the optical waveguide.

In particular, in the case where the cladding is made of a resin, the non-contacting relationship between the cores and the light absorbing part is maintained with higher reliability. Thus, the attenuation of light propagating in the cores is prevented with higher reliability.

Further, in the case where the cladding is covered with the light absorbing part, the area of the light absorbing part is made large adjacent to the light exit member connecting portions disposed in the first end portions of the adjacent cores. This increases the amount of light impinging upon and absorbed by the light absorbing part to further enhance the suppression of crosstalk.

Also, in the case where the cladding is made of air, a difference in refractive index between the cores and air (air cladding) is greater. This makes light propagating in the cores less prone to leak from the cores, thereby further enhancing the suppression of crosstalk.

DESCRIPTION OF EMBODIMENTS

Next, embodiments according to the present disclosure will now be described in detail with reference to the drawings.

Figure 1A:
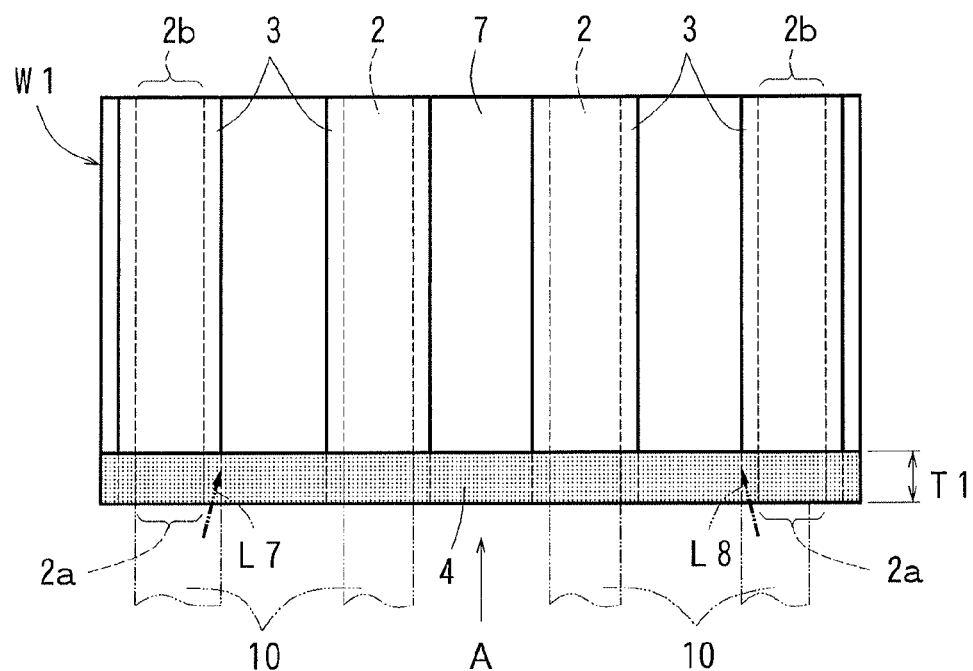
FIG. 1A is a schematic plan view of an optical waveguide according to a first embodiment of the present disclosure.
Figure 1B:
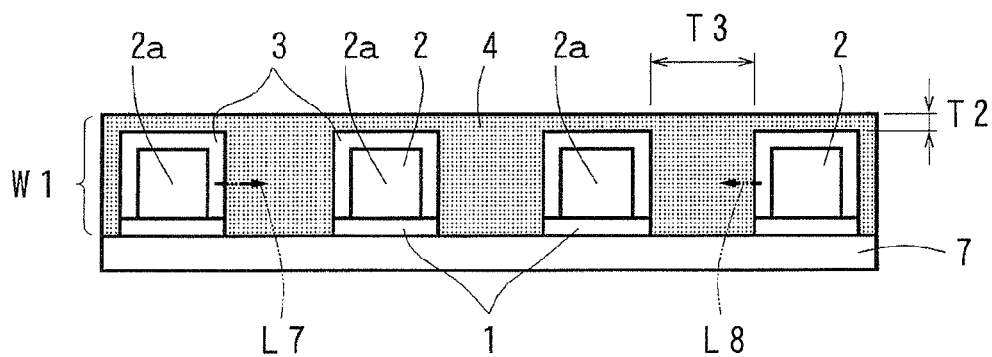
FIG. 1B is a schematic front view of the optical waveguide.

FIG. 1A is a plan view of an optical waveguide W1 according to a first embodiment of the present disclosure, and FIG. 1B is a front view (a view as seen in the direction of an arrow A in FIG. 1A) of the optical waveguide W1. The optical waveguide W1 according to the first embodiment includes: under claddings 1; cores 2 for light propagation; over claddings 3; and a light absorbing part 4. In FIG. 1B, the reference numeral 7 designates a substrate for use in the production of the optical waveguide W1.

The configuration of the optical waveguide W1 will be discussed in more detail. The under claddings 1 are a plurality of (in the figures, four) strip-shaped under claddings 1 arranged in side-by-side relation. The cores 2 for light propagation are formed individually on surfaces of the respective under claddings 1 and each extend in a longitudinal direction of the under claddings 1. Each of the cores 2 has a first longitudinal end portion (a lower end portion as seen in FIG. 1A) serving as a light exit member connecting portion for connection to a light exit member 10 such as an optical fiber, a light-emitting element, or the like and also serving as a light entrance portion 2a for receiving light exiting the light exit member 10, and a second longitudinal end portion (an upper end portion as seen in FIG. 1A) serving as a light exit portion 2b. Light exiting the light exit members 10 and entering the cores 2 through the light entrance portions 2a passes through the cores 2, and is propagated to the light exit portions 2b. The over claddings 3 are formed on the surfaces of the respective under claddings 1 so as to cover the respective cores 2 along side and top surfaces of the respective cores 2. The light absorbing part 4 is positioned adjacent to the light entrance portions (light exit member connecting portions) 2a disposed in the first end portions of the respective cores 2 and has a predetermined width (T1) so as to extend across the optical waveguide W1. In the first embodiment, the light absorbing part 4 is flush with the light entrance portions 2a disposed in the first end portions of the respective cores 2 at a first end surface of the optical waveguide W1. The light absorbing part 4 is integrally formed so as to cover side surfaces of the under claddings 1 and side and top surfaces of the over claddings 3. The light absorbing part 4 contains a light absorbing agent having an ability to absorb light exiting the light exit members 10. In FIG. 1A, optical fibers are shown as the light exit members 10.

In the first embodiment, if light exiting the light exit members 10 does not enter a predetermined one of the cores 2, most of the light impinges upon the light absorbing part 4 and is absorbed by the light absorbing part 4. As a result, the light does not enter a core 2 adjacent to the predetermined core 2 (with reference to dash-double-dot arrows L7 and L8). This enhances the suppression of crosstalk. In a left-hand end portion of FIG. 1A, a light exit member 10 and the light entrance portion 2a of a core 2 are slightly different in size from each other. In a right-hand end portion of FIG. 1A, a light exit member 10 and a core 2 are slightly misaligned with each other. The same applies to the subsequent figures.

The reduction in spacing between the cores 2 is achieved by reducing the width of portions of the light absorbing part 4 which lie between adjacent ones of the over claddings 3. In other words, the suppression of crosstalk is also enhanced even when the spacing between the cores 2 is reduced.

The light absorbing part 4 is provided between adjacent ones of the cores 2, with the over claddings 3 interposed between the light absorbing part 4 and the cores 2, and is in non-contacting relationship with the cores 2. This prevents light entering and propagating in the cores 2 from being absorbed and attenuated by the light absorbing part 4 to achieve proper light propagation.

The light absorbing part 4 will be discussed in more detail. Examples of the light absorbing agent include diimonium salts, cyanine dyes, naphthalocyanine dyes, and phthalocyanine dyes. The light absorbing agent contained in the light absorbing part 4 is determined by the wavelength of light to be absorbed (i.e., the wavelength of light exiting the light exit members 10). The aforementioned examples of the light absorbing agent are suitable for the absorption of light having a wavelength in the range of 750 to 1000 nm. Examples of a material for the formation of the light absorbing part 4 include photo-curable resins and thermosetting resins. The content of the light absorbing agent is, for example, 0.3 to 2.0 wt. % in the photo-curable resins and 0.5 to 30.0 wt. % in the thermosetting resins. The aforementioned examples of the light absorbing agent may be used either alone or in combination.

The light absorbing part 4 has, for example, the following dimensions: a depth T1 in the range of greater than 0 (zero) to 30 mm, preferably in the range of 100 µm to 20 mm, as measured from the first end surface of the optical waveguide W1; a thickness T2 in the range of greater than 0 (zero) to 200 µm as measured from the top surfaces of the over claddings 3; and a width T3 in the range of greater than 0 (zero) to 400 µm, preferably in the range of 30 to 250 µm, in portions present between adjacent ones of the over claddings 3.

An example of a method of manufacturing the optical waveguide W1 will be discussed below in detail.

First, the substrate 7 (with reference to FIG. 2A) is prepared. Examples of a material for the formation of the substrate 7 include metal, resin, glass, quartz, and silicon. The substrate 7 has a thickness in the range of 10 to 1000 µm, for example.

Figure 2A:
FIGS. 2A to 2D are illustrations schematically showing a method of manufacturing the optical waveguide.

Subsequently, as shown in FIG. 2A, the strip-shaped under claddings 1 arranged in side-by-side relation are formed on a surface of the substrate 7 by a photolithographic method with the use of a photosensitive resin that is a material for the formation of the under claddings 1. The under claddings 1 have the following dimensions: a thickness in the range of 5 to 50 μm; a width in the range of 30 to 500 μm; and a gap width of not less than 20 μm between adjacent ones of the under claddings 1, for example.

Figure 2B:
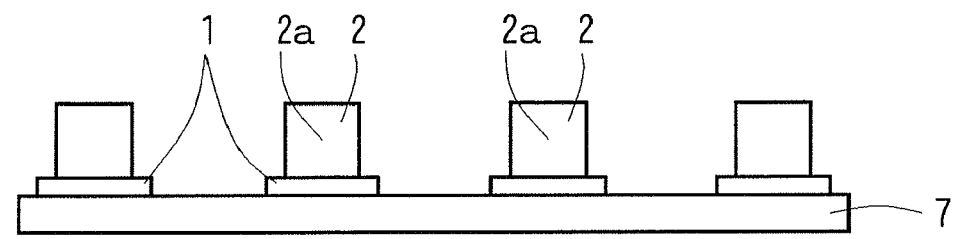

Next, as shown in FIG. 2B, the cores 2 are formed individually on the surfaces of the respective under claddings 1 by a photolithographic method with the use of a photosensitive resin that is a material for the formation of the cores 2 so as to each extend in a longitudinal direction of the under claddings 1. The cores 2 have the following dimensions: a thickness in the range of 10 to 80 μm; a width in the range of 8 to 90% of the width of the under claddings 1; and a gap width in the range of 20 to 500 μm between adjacent ones of the cores 2, for example. The material used herein for the formation of the cores 2 is a photosensitive resin having a refractive index higher than the refractive indices of the materials for the formation of the aforementioned under claddings 1 and the over claddings 3 to be described below (with reference to FIG. 2C).

Figure 2C:
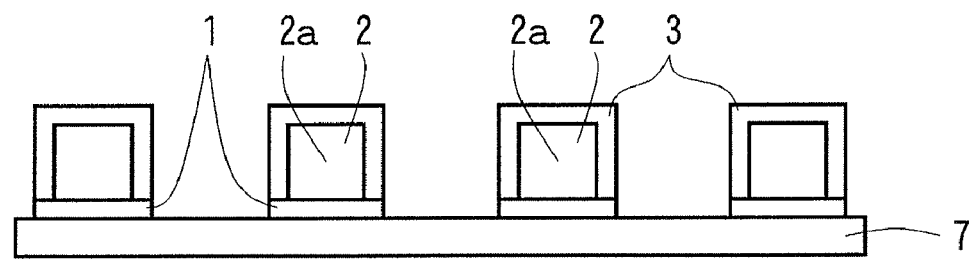

Subsequently, as shown in FIG. 2C, the over claddings 3 are formed on the surfaces of the respective under claddings 1 by a photolithographic method with the use of a photosensitive resin that is a material for the formation of the over claddings 3 so as to cover the respective cores 2 along the side and top surfaces of the respective cores 2. Portions of the over claddings 3 which cover the side surfaces of the cores 2 have a thickness in the range of 3 to 500 μm, and portions of the over claddings 3 which cover the top surfaces of the cores 2 have a thickness in the range of 3 to 50 μm, for example.

Figure 2D:
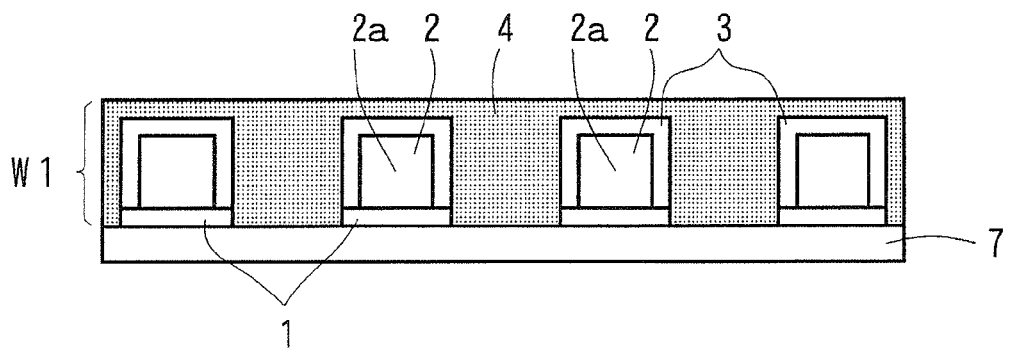

Then, as shown in FIG. 2D, the light absorbing part 4 is integrally formed on a first end portion (a lower end portion as seen in FIG. 1A) of the surface of the substrate 7 so as to cover the side surfaces of the under claddings 1 and the side and top surfaces of the over claddings 3. This light absorbing part 4 is formed by a manufacturing method depending on the material (photo-curable resins, thermosetting resins, and the like) for the formation of the light absorbing part 4. The light absorbing part 4 has the aforementioned dimensions.

In this manner, the optical waveguide W1 including the under claddings 1, the cores 2, the over claddings 3, and the light absorbing part 4 is produced on the surface of the substrate 7. This optical waveguide W1 may be used in contact with the surface of the substrate 7 or separate from the substrate 7.

Figure 3:
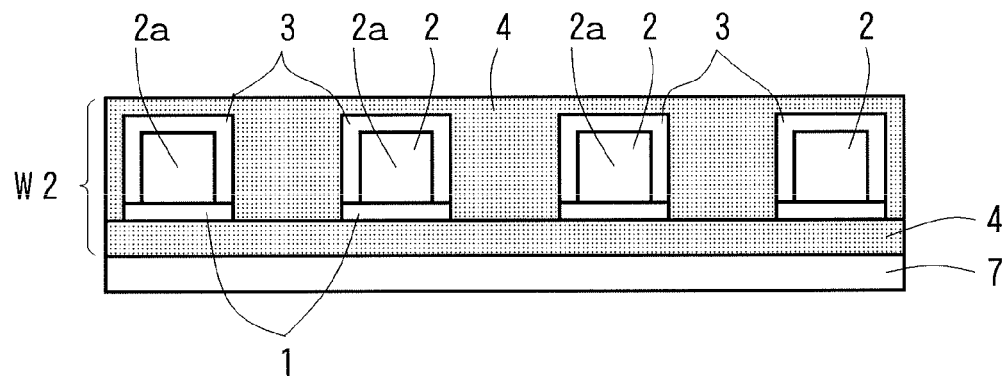
FIG. 3 is a schematic front view of the optical waveguide according to a second embodiment of the present disclosure.

FIG. 3 is a front view (a front view corresponding to FIG. 1B) of an optical waveguide W2 according to a second embodiment of the present disclosure. The second embodiment is configured such that a layer of the light absorbing part 4 is provided also between the under claddings 1 and the substrate 7 in the first embodiment shown in FIGS. 1A and 1B. Specifically, one layer of the light absorbing part 4 is formed on the entire surface of the substrate 7, and the under claddings 1 are formed on a surface of the layer of the light absorbing part 4. The layer of the light absorbing part 4 is also a component of the optical waveguide W2. The remaining parts of the second embodiment are similar to those of the first embodiment shown in FIGS. 1A and 1B, and like reference numerals and characters are used to designate similar parts.

In the second embodiment, the layer of the light absorbing part 4 is provided between the under claddings 1 and the substrate 7. Thus, the area of portions of the light absorbing part 4 which surround the light entrance portions 2*a* disposed in the first end portions of the cores 2 in the second embodiment is greater than that in the first embodiment. This increases the probability that light exiting the light exit members 10 and not entering a predetermined one of the cores 2 impinges upon the light absorbing part 4 to increase the amount of light absorbed by the light absorbing part 4. This further enhances the suppression of crosstalk. Further, if light propagating in the cores 2 leaks and the leaking light further leaks from the bottom surfaces of the under claddings 1, the light is absorbed by the layer of the light absorbing part 4. In this respect, the suppression of crosstalk is also further enhanced.

Figure 4:
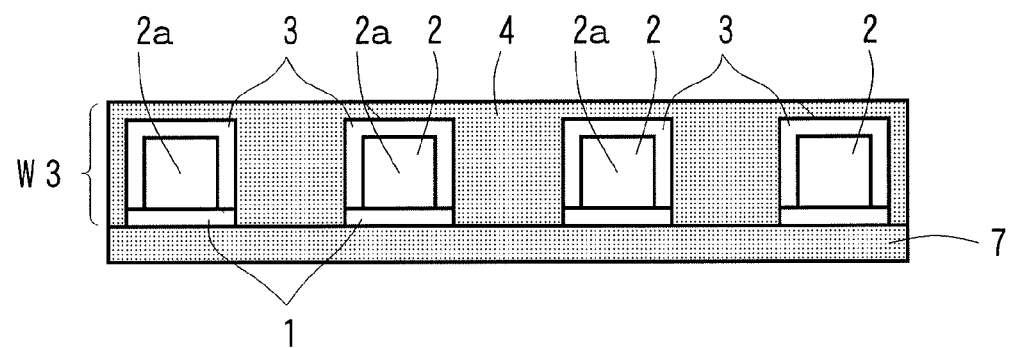
FIG. 4 is a schematic front view of the optical waveguide according to a third embodiment of the present disclosure.

FIG. 4 is a front view (a front view corresponding to FIG. 1B) of an optical waveguide W3 according to a third embodiment of the present disclosure. The third embodiment is configured such that the substrate 7 is made of the material for the formation of the light absorbing part 4 in the first embodiment shown in FIGS. 1A and 1B. In the third embodiment, the optical waveguide W3 is used in contact with the surface of the substrate 7. The remaining parts of the third embodiment are similar to those of the first embodiment shown in FIGS. 1A and 1B, and like reference numerals and characters are used to designate similar parts.

In the third embodiment, the substrate 7 is made of the material for the formation of the light absorbing part 4. Thus, the area of portions of the light absorbing part 4 and the substrate 7 which absorb light around the light entrance portions 2*a* disposed in the first end portions of the cores 2 in the third embodiment is greater than that in the first embodiment. This increases the amount of light absorbed by the light absorbing part 4 and the substrate 7 as in the aforementioned second embodiment to further enhance the suppression of crosstalk. Further, light leaking from the bottom surfaces of the under claddings 1 is absorbed by the substrate 7 as in the aforementioned second embodiment. In this respect, the suppression of crosstalk is also further enhanced.

Figure 5:
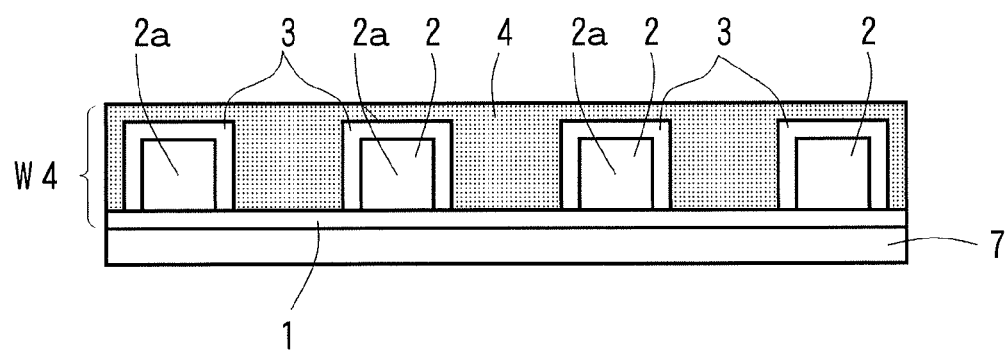
FIG. 5 is a schematic front view of the optical waveguide according to a fourth embodiment of the present disclosure.

FIG. 5 is a front view (a front view corresponding to FIG. 1B) of an optical waveguide W4 according to a fourth embodiment of the present disclosure. The fourth embodiment is configured such that an under cladding 1 in the form of an integral layer is formed in place of the strip-shaped under claddings 1 arranged in side-by-side relation in the first embodiment shown in FIGS. 1A and 1B. The light absorbing part 4 is formed on a first end portion (a portion corresponding to the lower end portion as seen in FIG. 1A) of the surface of the under cladding 1 other than where the cores 2 and the over claddings 3 are formed. The remaining parts of the fourth embodiment are similar to those of the first embodiment shown in FIGS. 1A and 1B, and like reference numerals and characters are used to designate similar parts.

In the fourth embodiment, the area of portions of the light absorbing part 4 which surround the light entrance portions 2*a* disposed in the first end portions of the cores 2 is smaller than that in the first embodiment, but the light absorbing part 4 is present between adjacent ones of the light entrance portions 2*a*. Thus, if light exiting the light exit members 10 does not enter a predetermined one of the cores 2, most of the light impinges upon the light absorbing part 4 and is absorbed by the light absorbing part 4, as in the first embodiment. As a result, this enhances the suppression of crosstalk.

Figure 6:
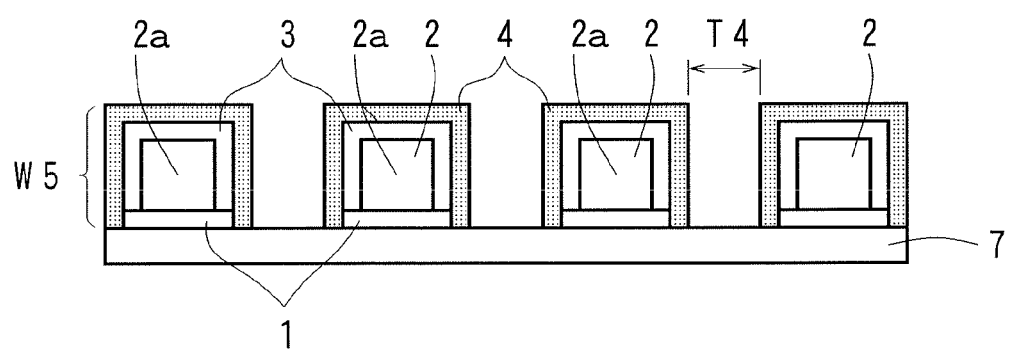
FIG. 6 is a schematic front view of the optical waveguide according to a fifth embodiment of the present disclosure.

FIG. 6 is a front view (a front view corresponding to FIG. 1B) of an optical waveguide W5 according to a fifth embodiment of the present disclosure. The fifth embodiment is configured such that light absorbing parts 4 are formed individually in corresponding relation to the cores 2 in the first embodiment shown in FIGS. 1A and 1B. Specifically, gaps are provided between adjacent ones of the light absorbing parts 4, and the light absorbing parts 4 cover the side surfaces of the respective under claddings 1 and the side and top surfaces of the respective over claddings 3. In the fifth embodiment, the optical waveguide W5 is used in contact with the surface of the substrate 7. The remaining parts of the fifth embodiment are similar to those of the first embodiment shown in FIGS. 1A and 1B, and like reference numerals and characters are used to designate similar parts.

In the fifth embodiment, the gaps are provided between adjacent ones of the light absorbing parts 4. The area of portions of the light absorbing parts 4 which surround the light entrance portions 2a disposed in the first end portions of the cores 2 is accordingly smaller than that in the first embodiment, but the light absorbing parts 4 are present between adjacent ones of the light entrance portions 2a. In addition, if light exiting the light exit members 10 enters the gaps between adjacent ones of the light absorbing parts 4, the light impinges upon the side surfaces of the light absorbing parts 4 and is absorbed by the side surfaces of the light absorbing parts 4. Thus, if light exiting the light exit members 10 does not enter a predetermined one of the cores 2, most of the light impinges upon the light absorbing parts 4 and is absorbed by the light absorbing parts 4, as in the first embodiment. As a result, this enhances the suppression of crosstalk.

The gaps between adjacent ones of the light absorbing parts 4 are formed by patterning the light absorbing part 4 by means of a photolithographic method in the step of forming the light absorbing part 4 (with reference to FIG. 2D). Alternatively, the gaps may be formed by cutting the light absorbing part 4 of the optical waveguide W1 of the first embodiment shown in FIGS. 1A and 1B. The gaps have a width T4 required only to exceed 0 (zero), preferably in the range of 5 to 200 µm.

Figure 7:
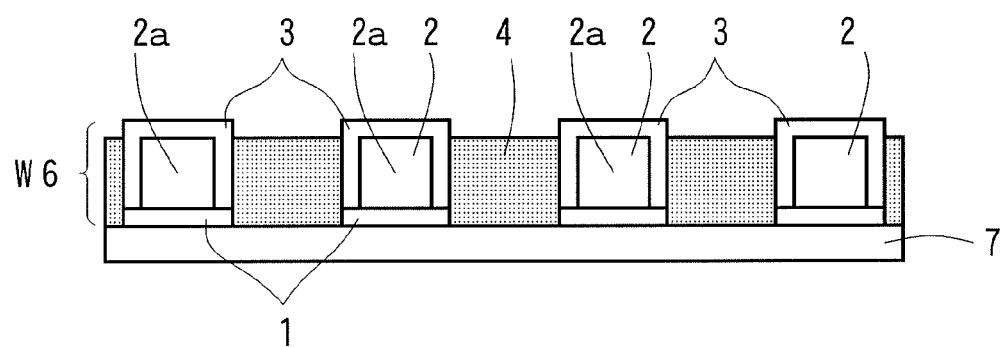
FIG. 7 is a schematic front view of the optical waveguide according to a sixth embodiment of the present disclosure.

FIG. 7 is a front view (a front view corresponding to FIG. 1B) of an optical waveguide W6 according to a sixth embodiment of the present disclosure. The sixth embodiment is configured such that the light absorbing part 4 in the first embodiment shown in FIGS. 1A and 1B is made thinner so as not to cover the top surfaces of the over claddings 3. In the sixth embodiment, the vertical position of a surface of the light absorbing part 4 is higher than that of bottom surfaces of the cores 2 (the vertical position of the surfaces of the under claddings 1). The remaining parts of the sixth embodiment are similar to those of the first embodiment shown in FIGS. 1A and 1B, and like reference numerals and characters are used to designate similar parts.

In the sixth embodiment, the light absorbing part 4 is made thinner than in the first embodiment. The area of portions of the light absorbing part 4 which surround the light entrance portions 2a disposed in the first end portions of the cores 2 is accordingly smaller than that in the first embodiment. However, if light exiting the light exit members 10 does not enter a predetermined one of the cores 2, part of the light impinges upon the light absorbing part 4 and is absorbed by the light absorbing part 4, as in the first embodiment. As a result, this enhances the suppression of crosstalk.

In the sixth embodiment, it is preferable that the vertical position of the surface of the light absorbing part 4 is level with the vertical position of the top surfaces of the cores 2, as shown in FIG. 7, from the viewpoint of further enhancing the suppression of crosstalk. The vertical position of the surface of the light absorbing part 4 may be higher than the vertical position of the top surfaces of the cores 2.

In the second to fifth embodiments, the vertical position of the surfaces of the light absorbing parts 4 may be determined in the same manner as in the sixth embodiment.

Figure 8A:
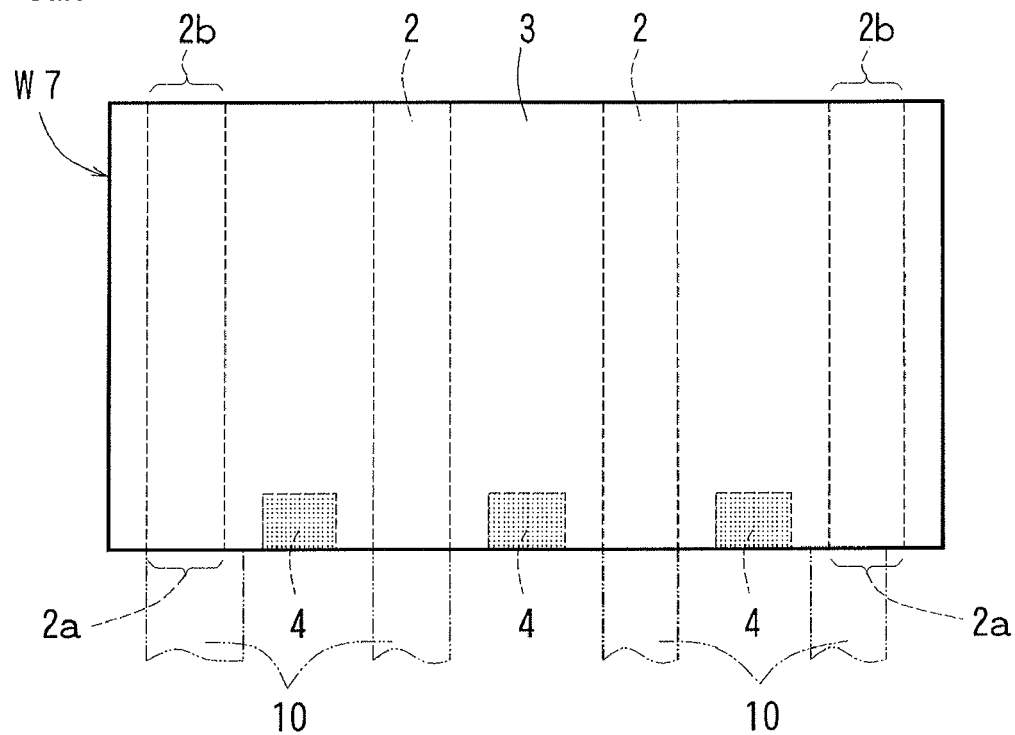
FIG. 8A is a schematic plan view of the optical waveguide according to a seventh embodiment of the present disclosure.
Figure 8B:
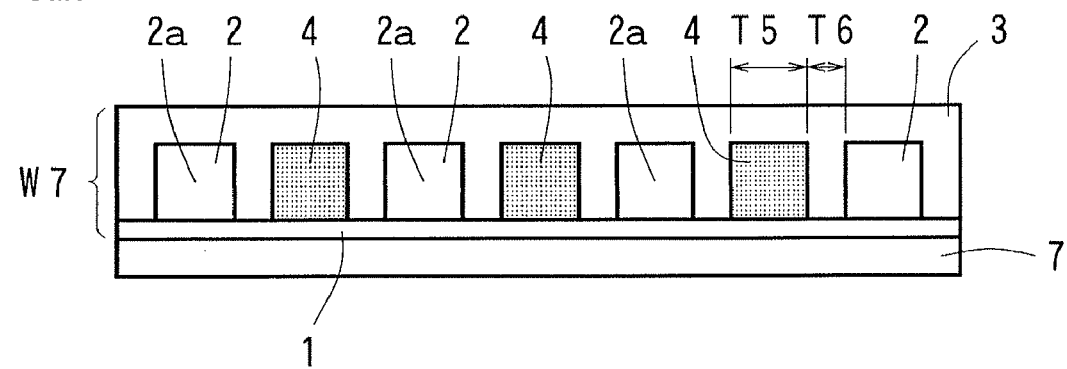
FIG. 8B is a schematic front view of the optical waveguide.

FIG. 8A a plan view of an optical waveguide W7 according to a seventh embodiment of the present disclosure, and FIG. 8B is a front view (a front view corresponding to FIG. 1B) of the optical waveguide W7. In the optical waveguide W7 according to the seventh embodiment, the under cladding 1 is in the form of one layer, and the plurality of (in the figures, four) linear cores 2 arranged in side-by-side relation are formed in predetermined positions on the surface of the under cladding 1. The linear light absorbing parts 4 are formed on surface portions of the under cladding 1 which lie between adjacent ones of the cores 2 and adjacent to the light entrance portions (light exit member connecting portions) 2a disposed in the first end portions of the respective cores 2, and are provided in non-contacting relationship with the cores 2. In the seventh embodiment, the cores 2 and the light absorbing parts 4 have the same thickness. An over cladding 3 is formed on the surface of the under cladding 1 so as to cover the cores 2 and the light absorbing parts 4. The remaining parts of the seventh embodiment are similar to those of the first embodiment shown in FIGS. 1A and 1B, and like reference numerals and characters are used to designate similar parts.

In the seventh embodiment, the area of portions of the light absorbing parts 4 which are around the light entrance portions 2a disposed in the first end portions of the cores 2 is smaller than that in the first embodiment, but the light absorbing parts 4 are present between adjacent ones of the light entrance portions 2a. Thus, if light exiting the light exit members 10 does not enter a predetermined one of the cores 2, most of the light impinges upon the light absorbing parts 4 and is absorbed by the light absorbing parts 4, as in the first embodiment. As a result, this enhances the suppression of crosstalk.

The light absorbing parts 4 in the seventh embodiment are formed to have a volume smaller than the volumes of the light absorbing parts 4 in the first to sixth embodiments. The seventh embodiment accordingly achieves savings in the material for the formation of the light absorbing parts 4.

A method of manufacturing the optical waveguide W7 according to the seventh embodiment is as follows. First, the under cladding 1 is formed on the surface of the substrate 7. Subsequently, the cores 2 are formed on the surface of the under cladding 1. Next, the light absorbing parts 4 are formed on the first end portion (the lower end portion as seen in FIG. 8A) of the surface of the under cladding 1, with gaps provided between the light absorbing parts 4 and the cores 2. Then, the over cladding 3 is formed on the surface of the under cladding 1 so as to cover the cores 2 and the light absorbing parts 4. In this manner, the optical waveguide W7 is produced on the surface of the substrate 7. The process of forming the cores 2 and the process of forming the light absorbing parts 4 may be performed in the reverse order. The light absorbing parts 4 have a width T5 required only to exceed 0 (zero), preferably in the range of 30 to 250 µm. The gaps between the cores 2 and the light absorbing parts 4 which are adjacent to each other have a width T6 required only to exceed 0 (zero), preferably in the range of 5 to 100 µm.

Figure 9:
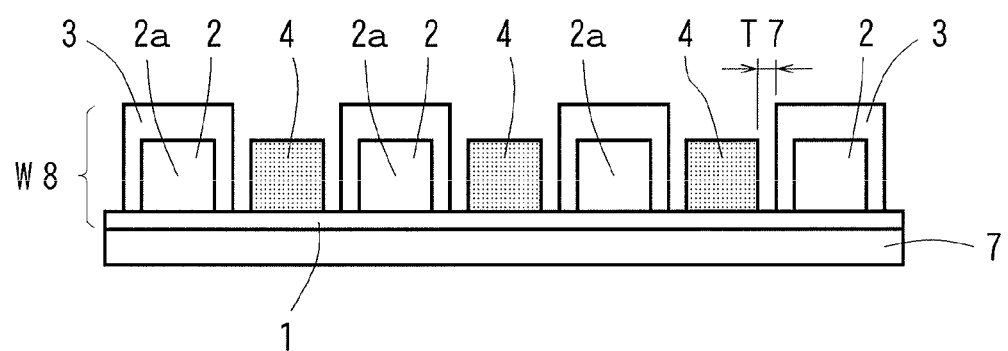
FIG. 9 is a schematic front view of the optical waveguide according to an eighth embodiment of the present disclosure.

FIG. 9 is a front view (a front view corresponding to FIG. 8B) of an optical waveguide W8 according to an eighth embodiment of the present disclosure. The eighth embodiment is configured such that the over claddings 3 are formed individually in corresponding relation to the cores 2 in the seventh embodiment shown in FIGS. 8A and 8B. Specifically, each of the cores 2 is covered with one of the over claddings 3, and the light absorbing parts 4 are not covered with the over claddings 3. In the eighth embodiment, gaps are provided between the over claddings 3 and the light absorbing parts 4 which are adjacent to each other. The remaining parts of the eighth embodiment are similar to those of the seventh embodiment shown in FIGS. 8A and 8B, and like reference numerals and characters are used to designate similar parts.

The eighth embodiment produces the light absorbing effect of the light absorbing parts 4 as in the seventh embodiment. This further enhances the suppression of crosstalk.

The gaps between the over claddings 3 and the light absorbing parts 4 which are adjacent to each other are formed by patterning the over cladding 3 by means of a photolithographic method in the method of manufacturing the optical waveguide W7 of the seventh embodiment shown in FIGS. 8A and 8B. The gaps have a width T7 required only to exceed 0 (zero), preferably in the range of 5 to 200 μm.

In the seventh and eighth embodiments, the thickness of the light absorbing parts 4 is equal to that of the cores 2. However, the thickness of the light absorbing parts 4 is required only to exceed 0 (zero). An upper limit to the thickness of the light absorbing parts 4 may be less than the thickness of the cores 2 or greater than the thickness of the cores 2.

The over claddings 3 made of a resin are formed in the seventh and eighth embodiments. However, the over claddings 3 need not be formed as in an optical waveguide W9 shown in FIG. 10 in front view (front view corresponding to FIG. 8B). Specifically, a cladding (air cladding) 30 made of air may be used in place of the over claddings 3 made of a resin. This provides a greater difference in refractive index between the cores 2 and air (air cladding 30) to make light propagating in the cores 2 less prone to leak from the cores 2, thereby further enhancing the suppression of crosstalk.

Figure 11A:
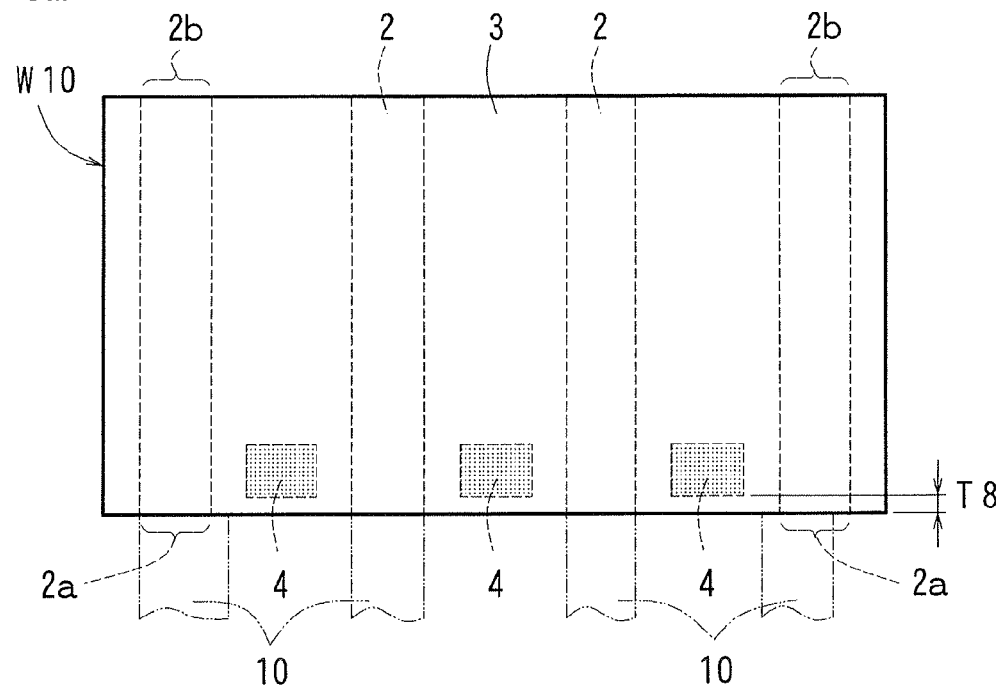
FIGS. 11A and 11B are schematic front views of other modifications of the optical waveguide according to the seventh embodiment.
Figure 11B:
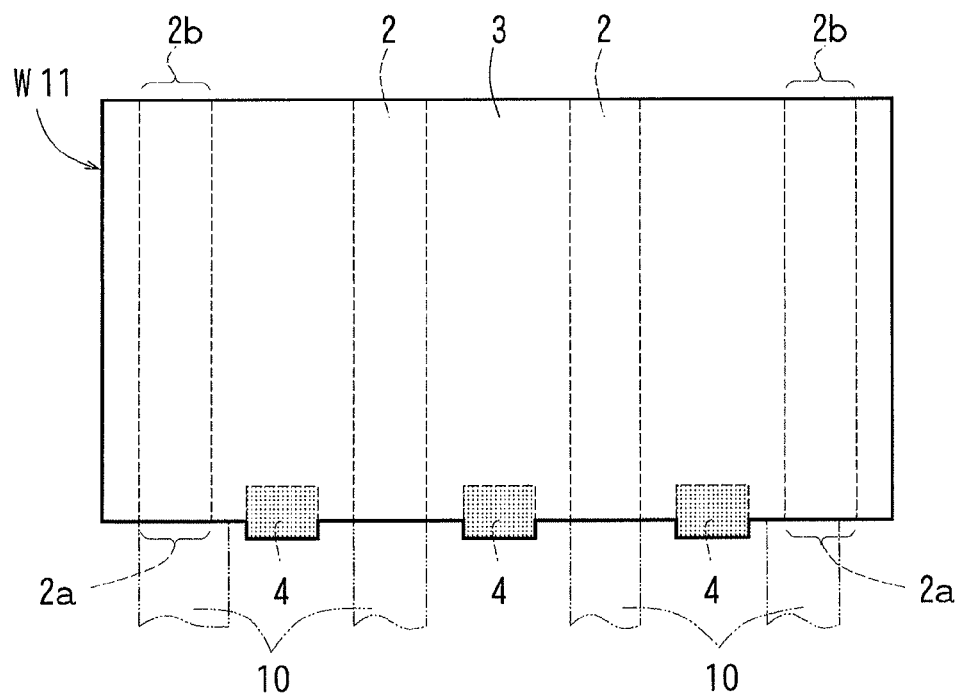

The light absorbing parts 4 at the first end surfaces of the optical waveguides W1 to W9 in the first to eighth embodiments are flush with the light entrance portions 2a disposed in the first end portions of the cores 2, but need not be flush with the light entrance portions 2a. For example, the light absorbing parts 4 may be disposed inward from the light entrance portions 2a disposed in the first end portions of the cores 2 as in an optical waveguide W10 shown in FIG. 11A in plan view. In this case, a distance T8 between the light entrance portions 2a and the light absorbing parts 4 is preferably not greater than 1 mm. This is because it is difficult to enhance the suppression of crosstalk if the distance T8 is too large. Alternatively, the light absorbing parts 4 may protrude from the light entrance portions 2a as in an optical waveguide W11 shown in FIG. 11B in plan view. In this case, the amount of protrusion is required only to exceed 0 (zero). It should be noted that modifications of the seventh embodiment (with reference to FIG. 8A) are shown in FIGS. 11A and 11B.

Figure 12A:
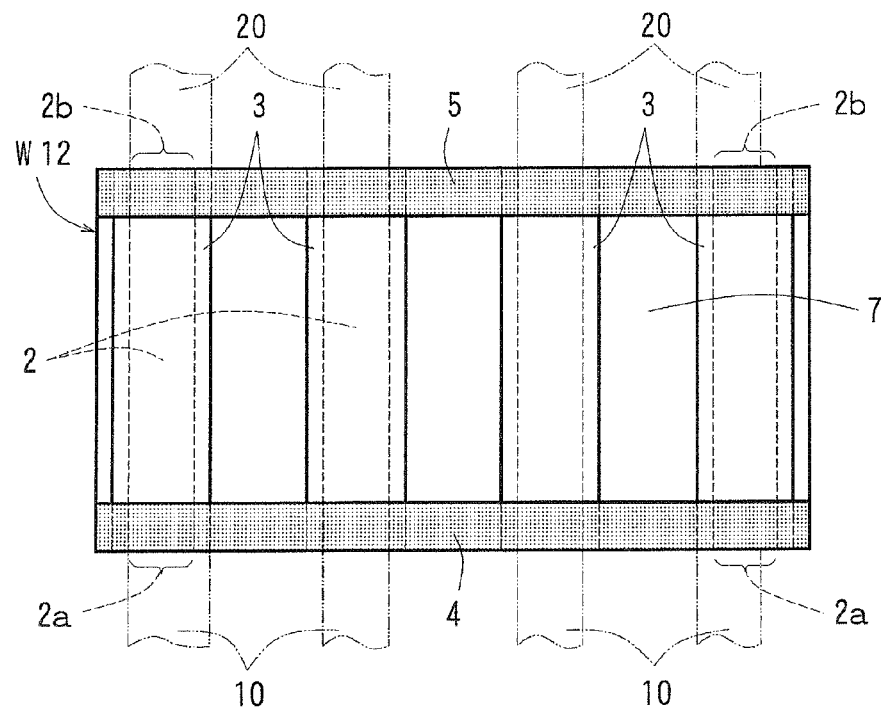
FIG. 12A is a schematic plan view of a modification of the optical waveguide according to the first embodiment.
Figure 12B:
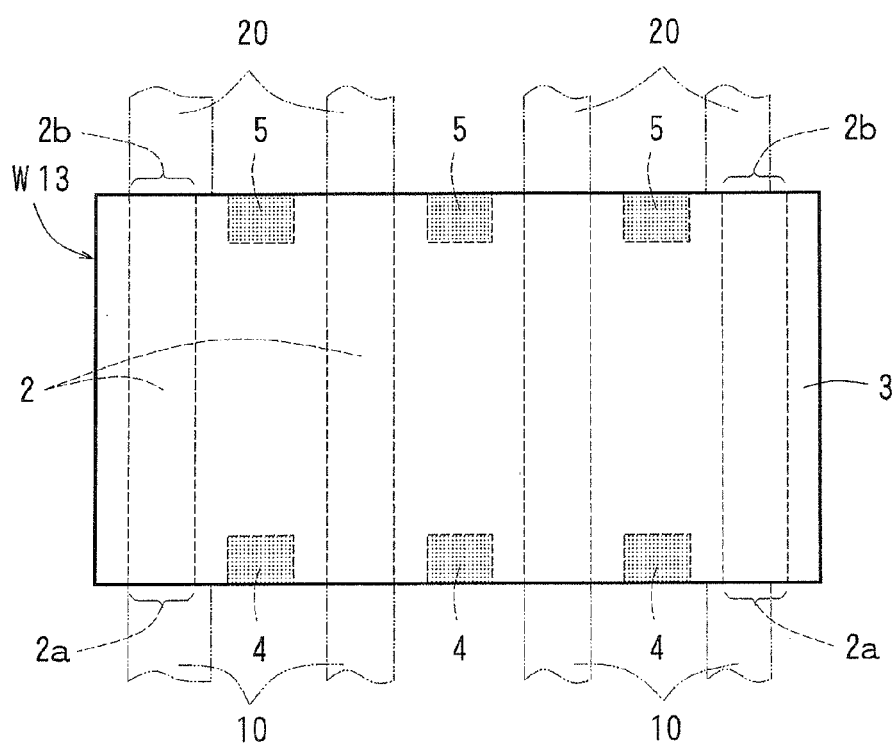
FIG. 12B is a schematic plan view of another modification of the optical waveguide according to the seventh embodiment.

The light absorbing parts 4 are provided in first end portions of the optical waveguides W1 to W9 in the first to eighth embodiments. Likewise, light absorbing parts 5 may be provided in second end portions as in optical waveguides W12 and W13 shown in FIGS. 12A and 12B in plan view. Specifically, there are cases in which light entrance members 20 such as optical fibers, light-receiving elements, or the like which receive light exiting the respective light exit portions 2b disposed in second end portions of the cores 2 are connected to the respective light exit portions 2b. In such cases, the light absorbing parts 5 may be positioned adjacent to the light exit portions (light entrance member connecting portions) 2b disposed in the second end portions of the cores 2. The provision of the light absorbing parts 5 in the second end portions in this manner suppresses the entrance of light leaking from a predetermined one of the cores 2 into the light entrance member 20 connected to the light exit portion 2b disposed in the second end portion of a core 2 adjacent to the predetermined core 2 (crosstalk). It should be noted that a modification of the first embodiment (with reference to FIG. 1A) is shown in FIG. 12A, and a modification of the seventh embodiment (with reference to FIG. 8A) is shown in FIG. 12B. In left-hand end portions of FIGS. 12A and 12B, a light entrance member 20 and the light exit portion 2b of a core 2 are slightly different in size from each other. In right-hand end portions of FIGS. 12A and 12B, a light entrance member 20 and a core 2 are slightly misaligned with each other. The same applies to the subsequent figures.

Figure 13A:
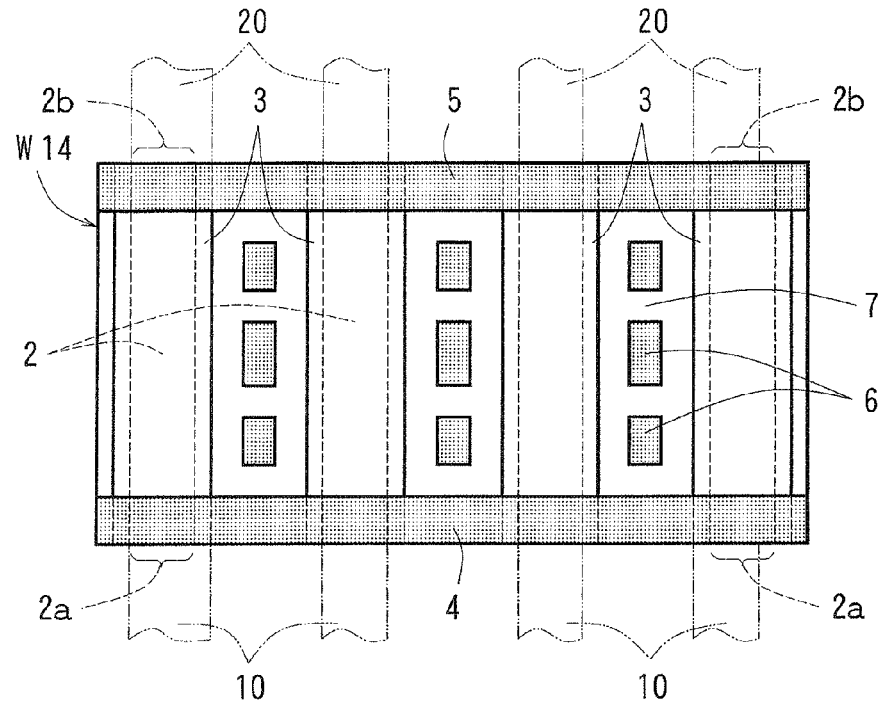
FIG. 13A is a schematic plan view of a modification of the optical waveguide of FIG. 12A.
Figure 13B:
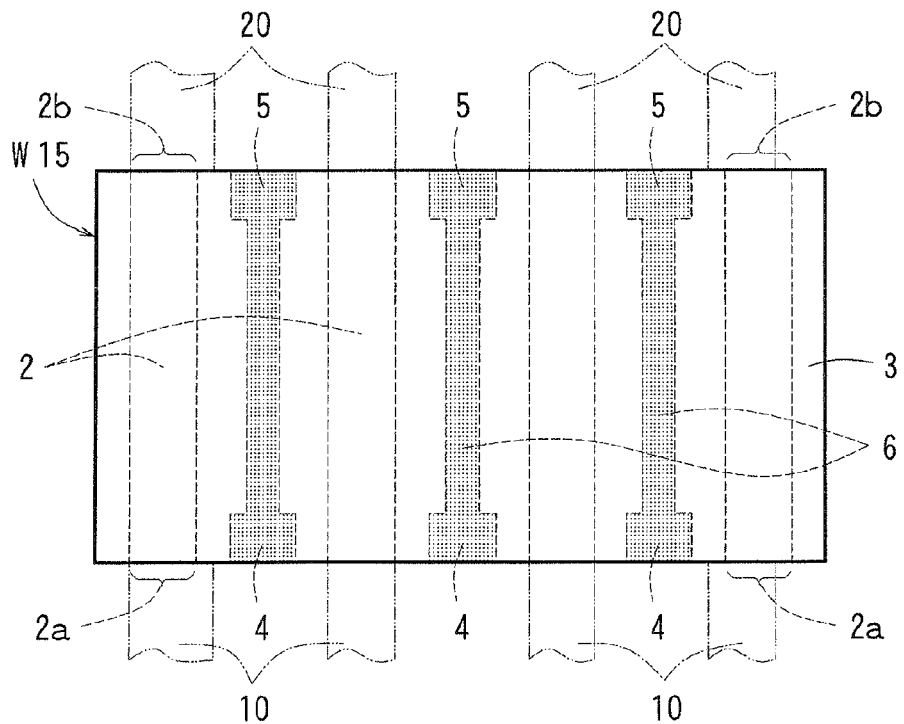
FIG. 13B is a schematic plan view of a modification of the optical waveguide of FIG. 12B.

Further, light absorbing parts 6 smaller in width than the light absorbing parts 4 and 5 may be formed intermittently (with reference to FIG. 13A) or continuously (with reference to FIG. 13B) between the light absorbing parts 4 and 5 in opposite end portions in FIGS. 12A and 12B as in optical waveguides W14 and W15 shown in FIGS. 13A and 13B in plan view. In this case, light not absorbed by the light absorbing parts 4 and 5 in the opposite end portions is absorbed by the light absorbing parts 6 in an intermediate portion. This further enhances the suppression of crosstalk.

Figure 14A:
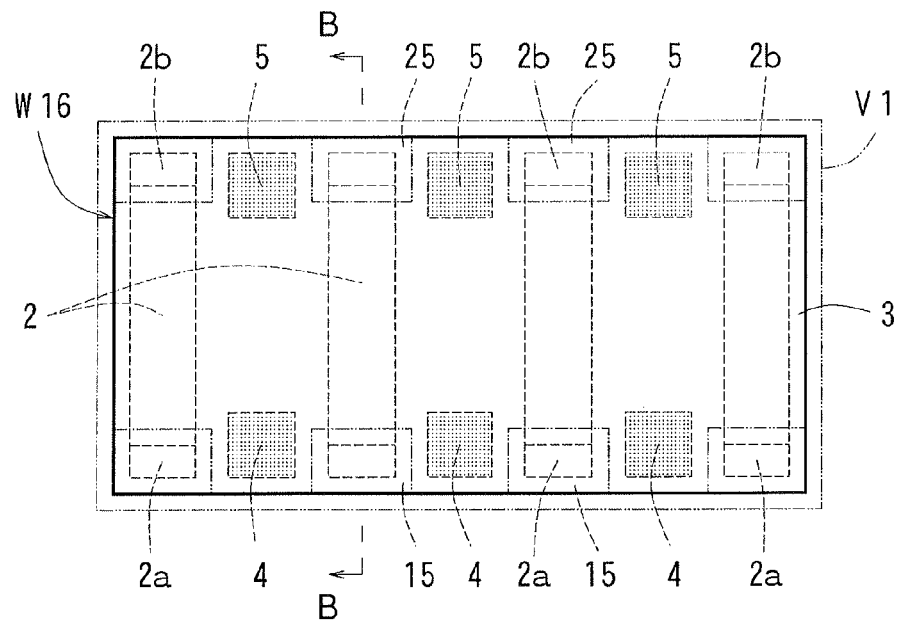
FIG. 14A is a schematic plan view of the optical waveguide according to a ninth embodiment of the present disclosure.

In FIGS. 12A and 12B, optical fibers are shown as the light exit members 10 and the light entrance members 20. However, optical elements may be used in place of the optical fibers. In that case, as shown in FIG. 14A in plan view and as shown in FIG. 14B in sectional view taken along the line B-B of FIG. 14A, light-emitting elements 15 and light-receiving elements 25 are mounted as the optical elements on a front surface of an electric circuit board V1, and an optical waveguide W16 according to a ninth embodiment of the present disclosure is formed on a back surface of the electric circuit board V1.

Figure 14B:
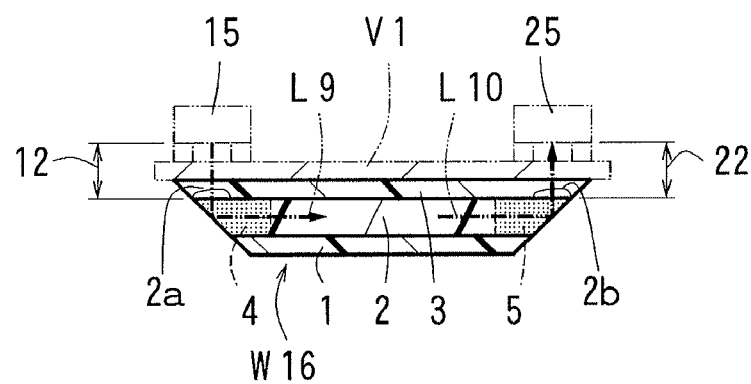
FIG. 14B is a schematic sectional view taken along the line B-B of FIG. 14A.

In the optical waveguide W16 according to the ninth embodiment, each of the cores 2 has a first end surface formed as an inclined light reflecting surface, and the light propagation between a light-emitting element 15 and each core 2 is achieved by the reflection of light from the light reflecting surface (with reference to a dash-double-dot arrow L9 in FIG. 14B). A surface portion of the first end portion of each core 2 which lies between the light reflecting surface and the light-emitting element 15 serves as a connecting portion to the light-emitting element 15 and also as the light entrance portion 2a. A slight gap 12 is provided between the light entrance portion 2a and the light-emitting element 15. The gap 12 has a length in the range of 3 to 100 μm, for example. Each of the cores 2 has a second end surface formed as an inclined light reflecting surface, and the light propagation between a light-receiving element 25 and each core 2 is achieved by the reflection of light from the light reflecting surface (with reference to a dash-double-dot arrow L10 in FIG. 14B). A surface portion of the second end portion of each core 2 which lies between the light reflecting surface and the light-receiving element 25 serves as a connecting portion to the light-receiving element 25 and also as the light exit portion 2b. A gap 22 similar to the gap 12 is provided between the light exit portion 2b and the light-receiving element 25. In the optical waveguide W16 according to the ninth embodiment, the light absorbing parts 4 and 5 are provided adjacent to the opposite longitudinal end portions [the light entrance portions (the connecting portions to the light-emitting elements 15) 2a and the light exit portions (the connecting portions to the light-receiving elements 25) 2b] of the cores 2.

Although the light absorbing parts 4 and 5 are provided adjacent to the opposite longitudinal end portions of the cores 2 in the ninth embodiment, the light absorbing parts 4 may be provided only adjacent to the light entrance portions (the connecting portions to the light-emitting elements 15) 2a disposed in the first end portions of the cores 2 (although not shown).

Figure 15A:
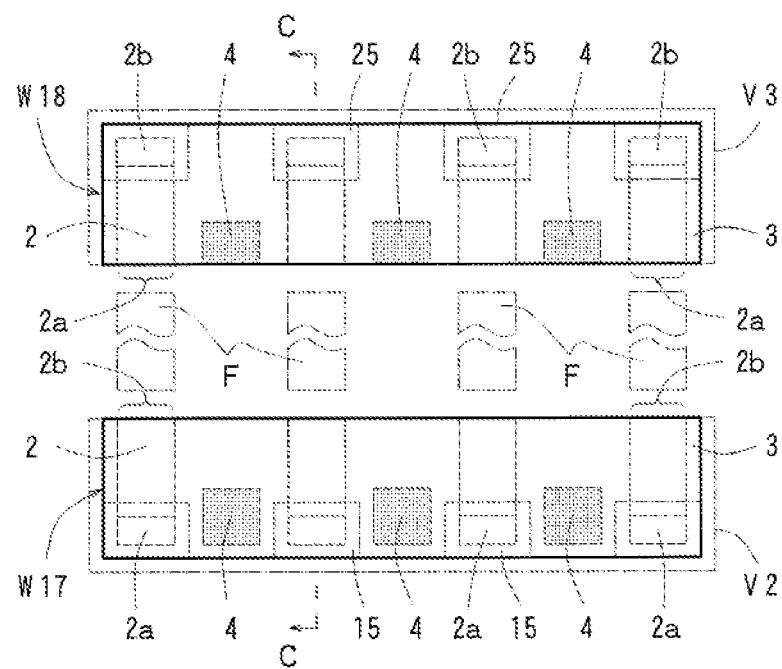
FIG. 15A is a schematic plan view of the optical waveguide according to a tenth embodiment of the present disclosure.
Figure 15B:
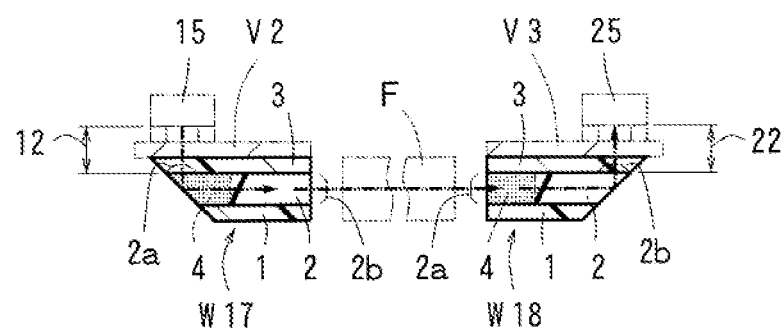
FIG. 15B is a schematic sectional view taken along the line C-C of FIG. 15A.

Further, both the optical fibers and the optical elements may be used as the light exit members 10 and the light entrance members 20. In that case, as shown in FIG. 15A in plan view and as shown in FIG. 15B in sectional view taken along the line C-C of FIG. 15A for example, the cores 2 of two optical waveguides W17 and W18 according to a tenth embodiment of the present disclosure are connected to each other through optical fibers F. Electric circuit boards V2 and V3 are provided on surfaces of the respective optical waveguides W17 and W18. The light-emitting elements 15 are mounted on a surface of the electric circuit board V2, and the light-receiving elements 25 are mounted on a surface of the electric circuit board V3.

In the optical waveguide W17 according to the tenth embodiment, the first end portion of each of the cores 2 is formed as an end portion having an inclined light reflecting surface and the light entrance portion 2a, like the first end portion of each core 2 of the optical waveguide W16 according to the ninth embodiment shown in FIGS. 14A and 14B, and the second end portion of each of the cores 2 is formed as the light exit portion 2b perpendicular to the longitudinal direction of the cores 2. In the optical waveguide W18, the first end portion of each of the cores 2 is formed as the light entrance portion 2a perpendicular to the longitudinal direction of the cores 2, and the second end portion of each of the cores 2 is formed as an end portion having an inclined light reflecting surface and the light exit portion 2b, like the second end portion of each core 2 of the optical waveguide W16 according to the ninth embodiment shown in FIGS. 14A and 14B.

In the tenth embodiment, light emitted from the light-emitting elements 15 passes through the cores 2 of the optical waveguide W17, the optical fibers F, and the cores 2 of the optical waveguide W18 in the order named, and is thereafter received by the light-receiving elements 25. In the optical waveguides W17 and W18 according to the tenth embodiment, the light absorbing part 4 is provided adjacent to the light entrance portions (the connecting portions to the light-emitting elements 15) 2a disposed in the first end portions of the cores 2 of the optical waveguide W17 and adjacent to the light entrance portions (connecting portions to the optical fibers F) 2a disposed in the first end portions of the cores 2 of the optical waveguide W18.

The light absorbing part is provided adjacent to the first longitudinal end portions of the cores 2 of the optical waveguides W17 and W18 in the tenth embodiment, but may be provided adjacent to the light exit portions (connecting portions to the optical fibers F) 2b disposed in the second end portions of the cores 2 of the optical waveguide W17 and adjacent to the light exit portions (the connecting portions to the light-receiving elements 25) 2b disposed in the second end portions of the cores 2 of the optical waveguide W18 (although not shown). See FIGS. 12A, 12B, 14A, and 14B.

Next, inventive examples of the present disclosure will be described in conjunction with a conventional example. It should be noted that the present disclosure is not limited to the inventive examples.

EXAMPLES

[Material for Formation of Under Cladding and Over Cladding]

Component a: 70 g of an epoxy resin (jER1001 available from Mitsubishi Chemical Corporation).

Component b: 20 g of an epoxy resin (EHPE3150 available from Daicel Corporation).

Component c: 10 g of an epoxy resin (EXA-4816 available from DIC Corporation).

Component d: 0.5 g of a photo-acid generator (CPI-101A available from San-Apro Ltd.).

Component e: 0.5 g of an antioxidant (Songnox1010 available from Kyodo Chemical Co., Ltd.).

Component f: 0.5 g of an antioxidant (HCA available from Sanko Co., Ltd.).

Component g: 50 g of ethyl lactate (a solvent).

A material for the formation of an under cladding and an over cladding was prepared by mixing these components a to g together.

[Material for Formation of Cores]

Component h: 50 g of an epoxy resin (YDCN-700-3 available from Nippon Steel & Sumikin Chemical Co., Ltd.).

Component i: 30 g of an epoxy resin (jER1002 available from Mitsubishi Chemical Corporation).

Component j: 20 g of an epoxy resin (OGSOL PG-100 available from Osaka Gas Chemicals Co., Ltd.).

Component k: 0.5 g of a photo-acid generator (CPI-101A available from San-Apro Ltd.).

Component l: 0.5 g of an antioxidant (Songnox1010 available from Kyodo Chemical Co., Ltd.).

Component m: 0.125 g of an antioxidant (HCA available from Sanko Co., Ltd.).

Component n: 50 g of ethyl lactate (a solvent). A material for the formation of cores was prepared by mixing these components h to n together.

[Material for Formation of Light Absorbing Part]

Component o: 50 g of an epoxy resin (YDCN-700-3 available from Nippon Steel & Sumikin Chemical Co., Ltd.).

Component p: 30 g of an epoxy resin (jER1002 available from Mitsubishi Chemical Corporation).

Component q: 20 g of an epoxy resin (OGSOL PG-100 available from Osaka Gas Chemicals Co., Ltd.).

Component r: 0.5 g of a photo-acid generator (CPI-101A available from San-Apro Ltd.).

Component s: 2.25 g of a light absorbing agent (NT-MB-IRL3801 available from Nitto Denko Corporation).

Component t: 50 g of ethyl lactate (a solvent).

A material for the formation of a light absorbing part was prepared by mixing these components o to t together.

Inventive Example 1

Using the aforementioned materials, the optical waveguide (having a length of 50 mm) of the first embodiment shown in FIGS. 1A and 1B was produced on a surface of a substrate made of a resin. The under claddings had the following dimensions: a thickness of 40 μm; a width of 100 μm; and a gap width of 150 μm between adjacent ones of the under claddings. The cores had the following dimensions: a thickness of 40 µm; a width of 40 µm; and a spacing of 250 µm therebetween. Portions of the over claddings which covered the side surfaces of the cores had a thickness of 30 µm, and portions of the over claddings which covered the top surfaces of the cores had a thickness of 30 µm. The light absorbing part had the following dimensions: a depth of 10 mm as measured from a first end surface of the optical waveguide; a width of 150 µm in portions present between adjacent ones of the over claddings; and a thickness of 15 µm as measured from the top surfaces of the over claddings.

Inventive Example 2

Using the aforementioned materials, the optical waveguide (having a length of 50 mm) of the second embodiment shown in FIG. 3 was produced on a surface of a substrate made of a resin. The layer of the light absorbing part provided between the under claddings and the substrate had a thickness of 20 µm. The remaining parts had the same dimensions as those in Inventive Example 1.

Inventive Example 3

Using the aforementioned materials, the optical waveguide (having a length of 50 mm) of the fourth embodiment shown in FIG. 5 was produced on a surface of a substrate made of a resin. The components including the cores had the same dimensions as those in Inventive Example 1.

Inventive Example 4

Using the aforementioned materials, the optical waveguide (having a length of 50 mm) of the fifth embodiment shown in FIG. 6 was produced on a surface of a substrate made of a resin. The gaps between adjacent ones of the light absorbing parts had a width of 50 µm. The remaining parts had the same dimensions as those in Inventive Example 1.

Inventive Example 5

Using the aforementioned materials, the optical waveguide (having a length of 50 mm) of the seventh embodiment shown in FIGS. 8A and 8B was produced on a surface of a substrate made of a resin. The light absorbing parts had the following dimensions: a depth of 10 mm as measured from the first end surface of the optical waveguide; a width of 150 µm; and a thickness of 40 µm. The gaps between the light absorbing parts and the cores which were adjacent to each other had a width of 30 µm. The remaining parts had the same dimensions as those in Inventive Example 1.

Inventive Example 6

Using the aforementioned materials, the optical waveguide (having a length of 50 mm) of the eighth embodiment shown in FIG. 9 was produced on a surface of a substrate made of a resin. The light absorbing parts had the following dimensions: a depth of 10 mm as measured from the first end surface of the optical waveguide; a width of 100 µm; and a thickness of 40 µm. The gaps between the over claddings and the light absorbing parts which were adjacent to each other had a width of 25 µm.

The remaining parts had the same dimensions as those in Inventive Example 1.

Inventive Example 7

The material for the formation of the light absorbing part in Inventive Example 1 was changed to a thermosetting material to be described below. The remaining parts were the same as those in Inventive Example 1.

Inventive Example 8

The material for the formation of the light absorbing part in Inventive Example 2 was changed to a thermosetting material to be described below. The remaining parts were the same as those in Inventive Example 2.

Inventive Example 9

Figure 10:
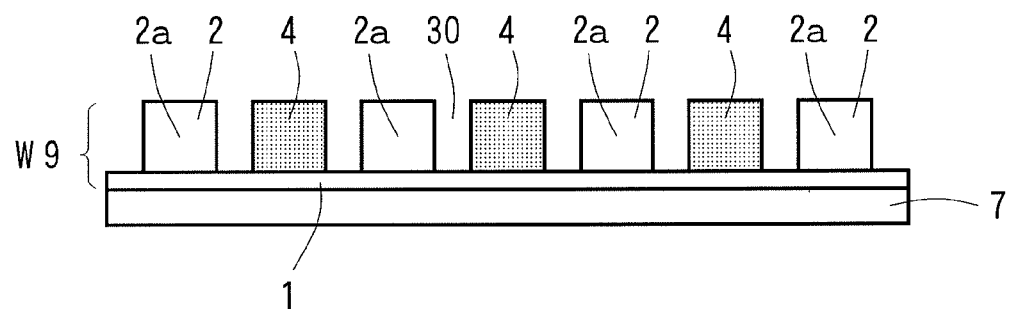
FIG. 10 is a schematic front view of a modification of the optical waveguide according to the seventh and eighth embodiments.

Using the aforementioned materials of Inventive Example 1, the optical waveguide (having a length of 50 mm) of the modification of the seventh and eighth embodiments shown in FIG. 10 was produced on a surface of a substrate made of a resin. The components including the cores had the same dimensions as those in Inventive Example 1.

Inventive Example 10

Using the aforementioned materials of Inventive Example 1, the optical waveguide (having a length of 50 mm) of the modification of the first embodiment shown in FIG. 12A was produced on a surface of a substrate made of a resin. The components including the cores had the same dimensions as those in Inventive Example 1.

[Thermosetting Material for Formation of Light Absorbing Part]

An epoxy resin (NT-8038 available from Nitta Denko Corporation) of the type in which a first liquid (resin) and a second liquid (curing agent) were mixed was prepared. Then, 50 g of the first liquid, 50 g of the second liquid, and 11 g of the light absorbing agent that was the aforementioned component s were mixed together to prepare the thermosetting material for the formation of the light absorbing part.

Conventional Example

Figure 16A:
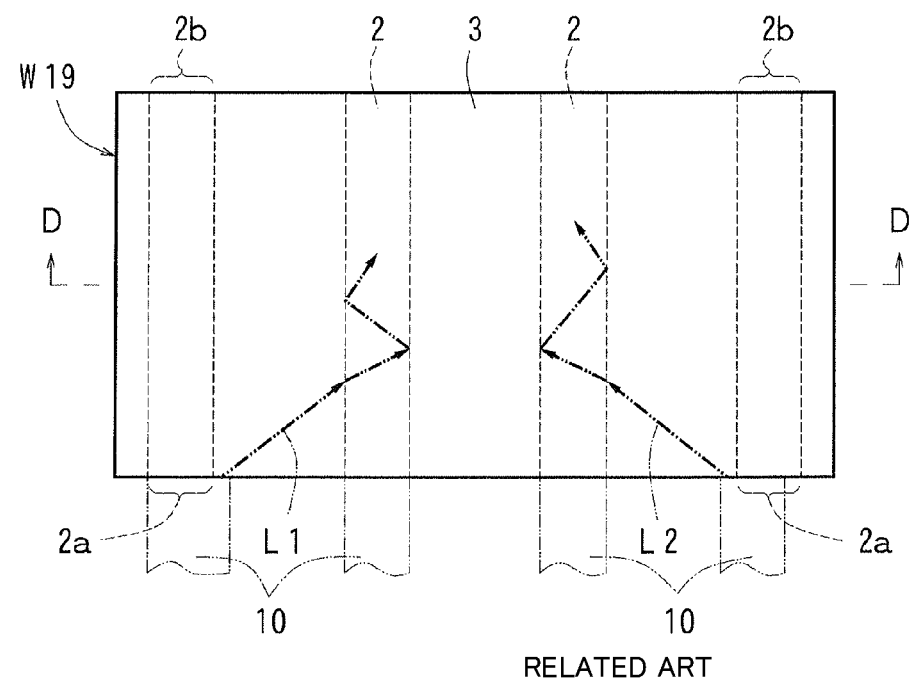
FIG. 16A is a schematic plan view of a conventional optical waveguide.
Figure 16B:
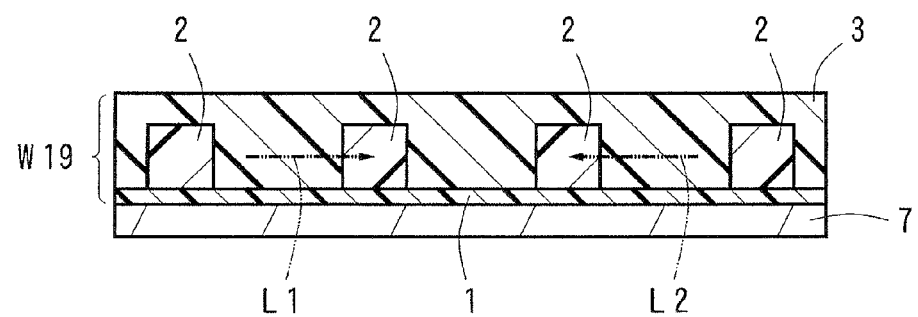
FIG. 16B is a schematic sectional view taken along the line D-D of FIG. 16A.
Figure 17:
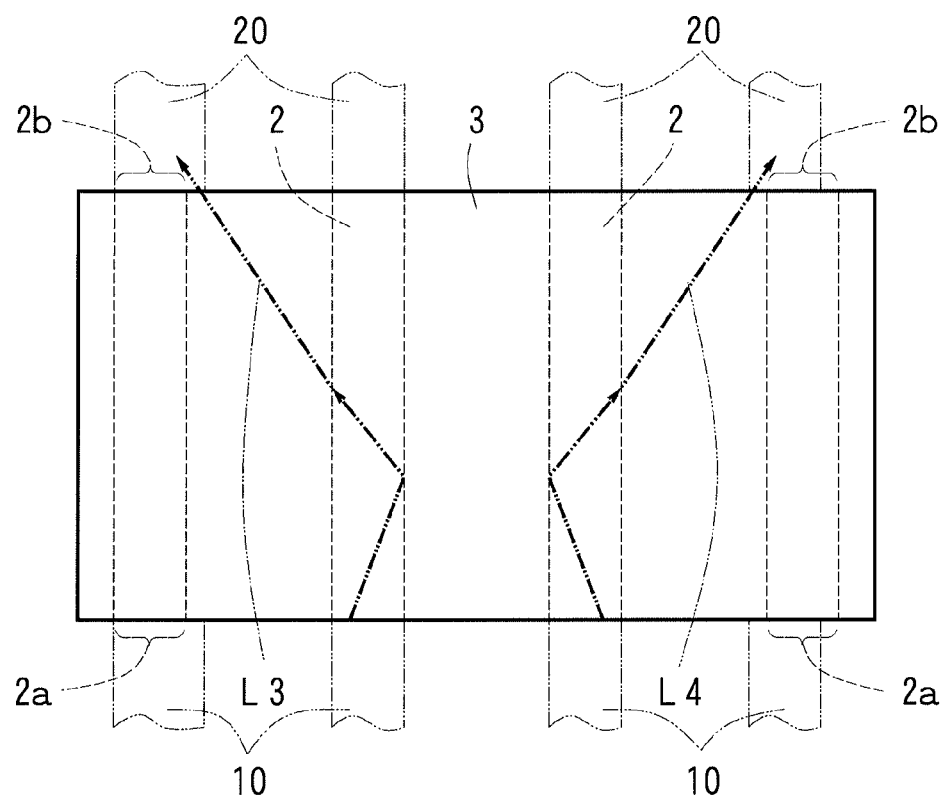
FIG. 17 is a schematic plan view of another conventional optical waveguide.
Figure 18A:
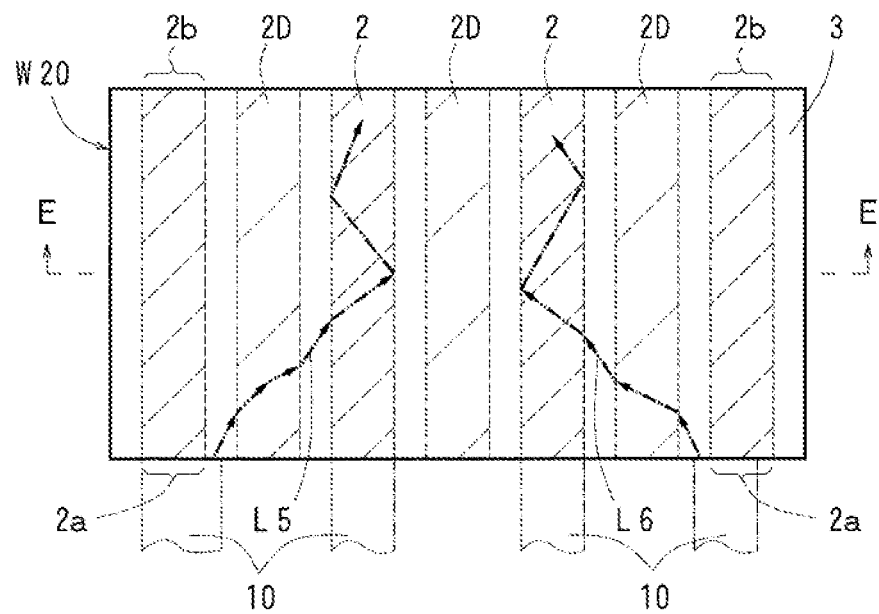
FIG. 18A is a schematic plan view of still another conventional optical waveguide.
Figure 18B:
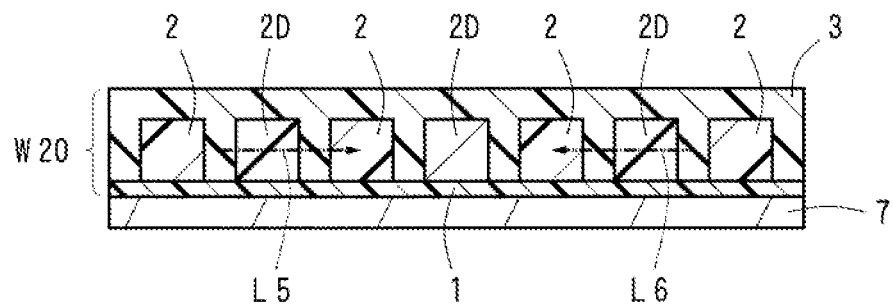
FIG. 18B is a schematic sectional view taken along the line E-E of FIG. 18A.

Using the aforementioned materials, the conventional optical waveguide (having a length of 50 mm) shown in FIGS. 16A and 16B in which no light absorbing parts were provided was produced on a surface of a substrate made of a resin. The over cladding had a thickness of 30 µm as measured from the top surfaces of the cores. The remaining parts had the same dimensions as those in Inventive Example 1.

[Calculation of Crosstalk Suppressing Value]

Prepared were a graded index (GI) type multimode optical fiber (a first optical fiber) having a diameter of 50 µm and connected to a VCSEL light source (OP250-LS-850-MM50-SC available from Miki Inc. and having an emission wavelength of 850 nm), and a step-index (SI) multimode optical fiber (a second optical fiber) having a diameter of 105 µm and connected to an optical power meter (Q8221 available from Advantest Corporation). Then, a front end of the first optical fiber and a front end of the second optical fiber were brought into abutment with each other. The optical power meter received light coming from the VCSEL light source to measure the intensity ($I_0$) of the received light.

Subsequently, the front end of the first optical fiber was temporarily connected to a light entrance portion (a first end portion) of one of the cores in the optical waveguide of each of Inventive Examples 1 to 10 and Conventional Example. The front end of the second optical fiber was temporarily connected to a light exit portion (a second end portion) of the one core. The optical power meter received light coming from the VCSEL light source while the positions of the front ends of both of the optical fibers were changed. At a position where the intensity of the received light became maximum, the front end of the first optical fiber was fixed to the light entrance portion (the first end portion) of the one core. This achieved the positioning of the first optical fiber kept in alignment.

Next, the front end of the first optical fiber was moved 10 μm toward a core adjacent to the one core, so that light exiting the front end of the first optical fiber was prone to enter the over cladding around the one core and prone to cause crosstalk. Subsequently, the front end of the second optical fiber was connected to the light exit portion (the second end portion) of a core adjacent to the one core. In that state, the optical power meter measured the intensity (I) of the received light. Then, $[-10\times\log(I/I_0)]$ was calculated from the measured intensities of the received light, and the calculated value was defined as a crosstalk suppressing value. The results were listed in TABLE 1 below.

TABLE 1

| | Inv. Ex. | | | | | | | | | | Conv. Ex. |
|---|---|---|---|---|---|---|---|---|---|---|---|
| | 1 | 2 | 3 | 4 | 5 | 6 | 7 | 8 | 9 | 10 | |
| Crosstalk suppressing value (dB) | 50 | 52 | 47 | 49 | 45 | 47 | 60 | 60 | 45 | 55 | 35 |

The results in TABLE 1 show that Inventive Examples 1 to 10 in which the light absorbing parts are provided suppress crosstalk more than the Conventional Example in which no light absorbing parts are provided. In particular, it is found that crosstalk is suppressed more excellently in Inventive Examples 7 and 8 in which the thermosetting material is used as the material for the formation of the light absorbing part because the light absorbing part is able to contain a large amount of light absorbing agent. Also, a comparison between Inventive Examples 1 and 10 shows that Inventive Example 10 in which the light absorbing parts are provided in the opposite end portions of the optical waveguide is more excellent in suppression of crosstalk than Inventive Example 1 in which the light absorbing part is provided in the first end portion of the optical waveguide.

The optical waveguides shown in FIGS. 4, 7, 11A, 11B, 12B, 13A, 13B, 14A, 14B, 15A, and 15B also attained results having tendencies similar to those in Inventive Examples described above.

In particular, in the optical waveguides shown in FIGS. 12A, 12B, 13A, 13B, 14A, and 14B in which the light absorbing parts were provided in the opposite end portions thereof, the front end of the second optical fiber was moved 10 μm toward the core connected to the first optical fiber, so that crosstalk was more prone to occur during the measurement of the crosstalk. In such cases, results having tendencies similar to those in Inventive Examples described above were attained.

Although specific forms in the present disclosure have been described in the aforementioned examples, the aforementioned examples should be considered as merely illustrative and not restrictive. It is contemplated that various modifications evident to those skilled in the art could be made without departing from the scope of the present disclosure.

The optical waveguide according to the present disclosure is usable for enhancing the suppression of crosstalk.

REFERENCE SIGNS LIST

W1 Optical waveguide
1 Under claddings
2 Cores
3 Over claddings
4 Light absorbing parts
7 Substrate
10 Light exit members

The invention claimed is:

1. An optical waveguide comprising:
   a plurality of cores for light propagation arranged in side-by-side relation; and
   a light absorbing part provided between adjacent ones of the cores for light propagation, the light absorbing part being in non-contacting relationship with the cores,
   wherein each of the cores is strip-shaped extending in a direction of travel of light and has a first end portion serving as a light exit member connecting portion for connection to a light exit member,
   wherein the light absorbing part is positioned at least adjacent to the light exit member connecting portions disposed in the first end portions of the adjacent cores, is not disposed at all positions along a longitudinal direction of the adjacent cores, and contains a light absorbing agent having an ability to absorb light exiting the light exit members, and
   wherein an end of the light absorbing part which is nearest to the light exit member connecting portions is spaced from the light exit member connecting portions by a distance in the longitudinal direction of the adjacent cores of greater than or equal to 0 mm and less than 1 mm, or protrudes from the light exit member connecting portions, and
   wherein the light absorbing part is at least partially disposed at a same position in a thickness direction of the optical waveguide as the plurality of cores, the thickness direction being perpendicular to the longitudinal direction of the cores.

2. The optical waveguide according to claim 1,
   wherein each of the cores has a second end portion serving as a light entrance member connecting portion for connection to a light entrance member, and
   wherein the light absorbing part is positioned also adjacent to the light entrance member connecting portions disposed in the second end portions of the adjacent cores.

3. The optical waveguide according to claim 1, further comprising a cladding surrounding the cores between the light absorbing part and the cores.

4. The optical waveguide according to claim 3, wherein the cladding is made of a resin.

5. The optical waveguide according to claim 4, wherein the cladding is covered with the light absorbing part.

6. The optical waveguide according to claim 3, wherein the cladding is made of air.

* * * * *